(12) United States Patent
Suzuki (10) Patent No.: US 6,525,778 B1
(45) Date of Patent: Feb. 25, 2003

(54) IMAGE DISPLAY UNIT FOR DISPLAYING UNDISTORTED IMAGES HAVING DIFFERENT ASPECT RATIOS

(75) Inventor: Hitoshi Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/391,522

(22) Filed: Sep. 8, 1999

(30) Foreign Application Priority Data

Sep. 10, 1998 (JP) .......................................... 10-256636

(51) Int. Cl.[7] .............................. H04N 5/46; H04N 5/44; H04N 11/20; H04N 7/08
(52) U.S. Cl. ...................... 348/556; 913/561; 913/445; 913/476
(58) Field of Search ................................. 348/556, 564, 348/913, 558, 561, 476, 704, 445; 345/13, 14

(56) References Cited

U.S. PATENT DOCUMENTS

| | | | | |
|---|---|---|---|---|
| 5,170,256 A | * | 12/1992 | Tabata ........................... 358/230 |
| 5,351,135 A | * | 9/1994 | Saeger ......................... 348/435 |
| 5,386,236 A | * | 1/1995 | Hong ........................... 348/445 |
| 5,497,198 A | * | 3/1996 | Kim ............................. 348/445 |
| 5,506,696 A | * | 4/1996 | Kim ............................. 348/445 |
| 5,537,149 A | * | 7/1996 | Teraoka et al. .............. 348/556 |
| 5,764,297 A | * | 6/1998 | Sengoku ...................... 348/445 |
| 5,805,234 A | * | 9/1998 | Matsuura ..................... 348/558 |
| 5,825,427 A | * | 10/1998 | MacLeod .................... 348/445 |
| 5,973,749 A | * | 10/1999 | Ishii et al. ................... 348/558 |
| 6,020,872 A | * | 2/2000 | Mizukata et al. ............. 345/99 |

* cited by examiner

*Primary Examiner*—John Miller
*Assistant Examiner*—Paulos Natnael
(74) *Attorney, Agent, or Firm*—Jay H. Maioli (57) ABSTRACT

A display unit for displaying an image on a screen having aspect ratio different from a video signal without distorting the image utilizing an effective screen up to the maximum. In which the whole image information in a horizontal cycle of an input video signal is compressed on a time basis by a signal processor means to generate a new video signal corresponding to processor. Synchronizing signals HD" and VD" corresponding to the new video signal generated by the signal processor are generated based upon synchronizing signals HD and VD separated from the input signal by synchronizing signal generator. In the display unit composed of a vertically deflecting circuit, a horizontally deflecting circuit and CRT, scanning by an electron beam is controlled according to the synchronizing signals HD" and VD" and a video signal compressed on a time basis is displayed on the CRT.

4 Claims, 8 Drawing Sheets

FIG. 6A NTSC

FIG. 6B AFTER CONVERSION

FIG. 6C DEFLECTING CURRENT

FIG. 7A  480 LINES

FIG. 7B  400 LINES

FIG. 7C  DEFLECTING CURRENT

IMAGE DISPLAY UNIT FOR DISPLAYING UNDISTORTED IMAGES HAVING DIFFERENT ASPECT RATIOS

BACKGROUND OF THE INVENTION

1. Field of the Invention

The present invention relates to a display unit for inputting a video signal and displaying an image corresponding to the video signal and more particularly to an image display unit suitable for displaying an image having aspect ratio different from the aspect ratio of the effective screen of a display on which an image is displayed.

2. Description of the Related Art

A conventional type display unit for inputting a video signal such as a television signal and displaying it on a display such as a cathode-ray tube (CRT) and a liquid crystal panel is provided with various means to prevent a displayed image from being distorted in case the aspect ratio of the effective screen of the display and the aspect ratio of an input video signal are different.

Figure 1:
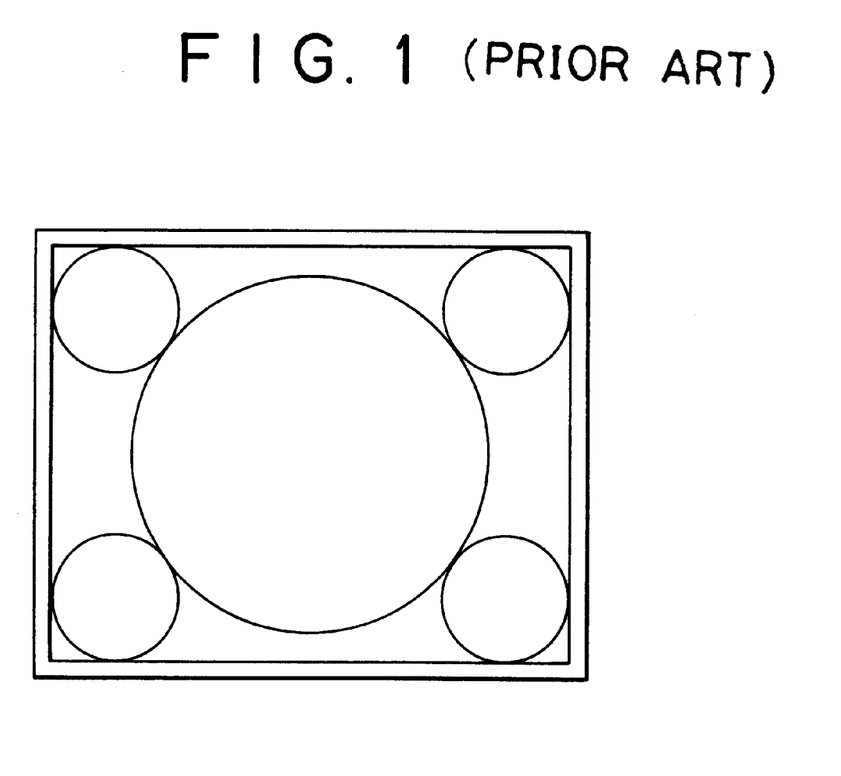
FIG. 1 shows an original image input as a video signal and having the aspect ratio of 3:4.

For example, a case that a video signal having the aspect ratio of 3:4 is displayed on a display unit provided with an effective screen having the aspect ratio of 9:16 will be described below. FIG. 1 shows an original image input as a video signal and having the aspect ratio of 3:4. This original image is composed of a large circle in the center and four small circles touched to the circumference of the large circle.

Figure 2A:
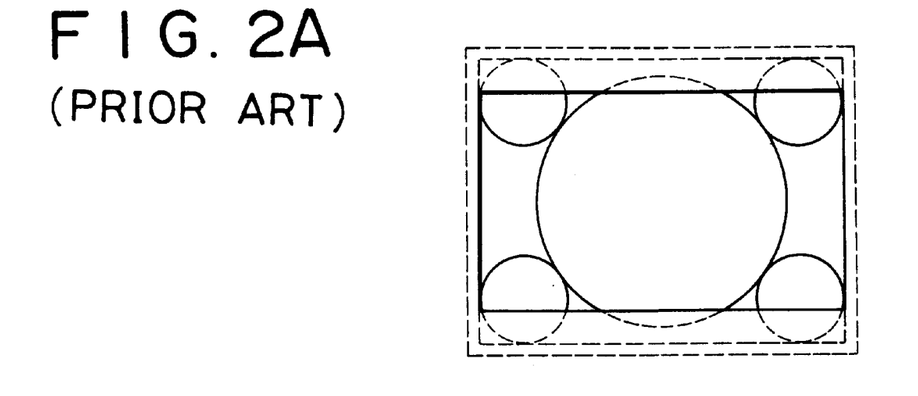
FIGS. 2A to 2C show an example in which the image shown in FIG. 1 is displayed by a conventional type display unit.
Figure 2B:
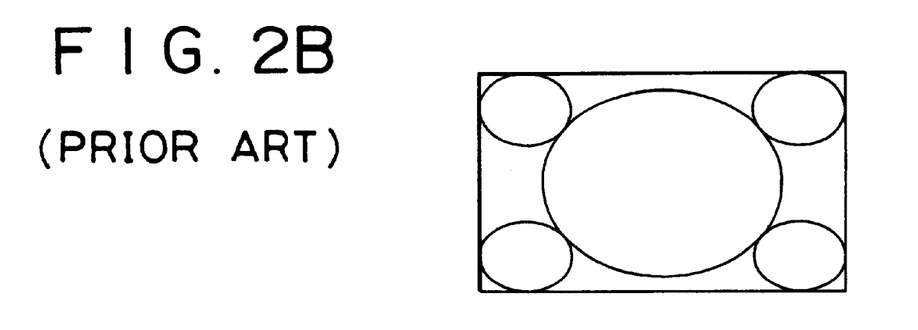
Figure 2C:
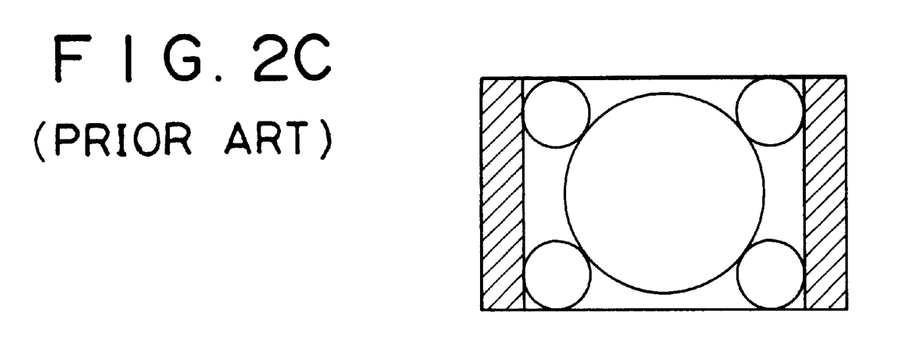

FIGS. 2A to 2C show an example that the original image shown in FIG. 1 and having the aspect ratio of 3:4 is displayed on a display unit provided with an effective screen having the aspect ratio of conventional 9:16. FIG. 2A shows a state in which the original image is displayed as it is in the lateral direction and the ratio of 3:4 of a video signal is kept in the longitudinal direction so that the image is not distorted. In this case, the image is cut off by approximately 25% in the upper and lower parts. FIG. 2B shows a state in which the original image is displayed as it is in the longitudinal direction and the original image is extended in the lateral direction so that it is matched with the ratio of the effective screen. In this case, the image is distorted and looks to be pressed longitudinally, that is, extended laterally as a whole. FIG. 2C shows a state in which the original image is displayed as it is in the longitudinal direction and the ratio of 3:4 of an original image is kept so that the image in the lateral direction is not distorted. In this case, the right and left sides of the screen are largely vacant and the screen of the display cannot be effectively used.

As shown in FIG. 2C, to display an original image in the image display device having an effective screen whose aspect ratio is 9:16 in a state that an aspect ratio of 3:4 is maintained, the amplitude of horizontally deflecting current must be reduced. In this case, as described below, however, there is a problem that image information at right and left corners cannot be displayed correctly due to ringing of horizontally deflecting current.

In other words, immediately after the start of tracing, randomness of waveforms occurs in horizontally deflecting current due to ringing components caused by the inductance of a horizontally deflecting coil and resonance of interline capacity, etc., scanning speed of electric beam is delayed, and thus the image at the right and left corners is deformed. As shown in FIG. 2C, to display an original image in the image display device having an effective screen whose aspect ratio is 9:16 in a state that an aspect ratio of 3:4 is maintained, the video signals corresponding to the image portions at the right and left corners of the screen must therefore be blanked so that deformed portions of the image cannot be seen. The image information at the right and left corners is cut off, and so the whole image information at the horizontal period cannot be displayed.

Figure 3A:
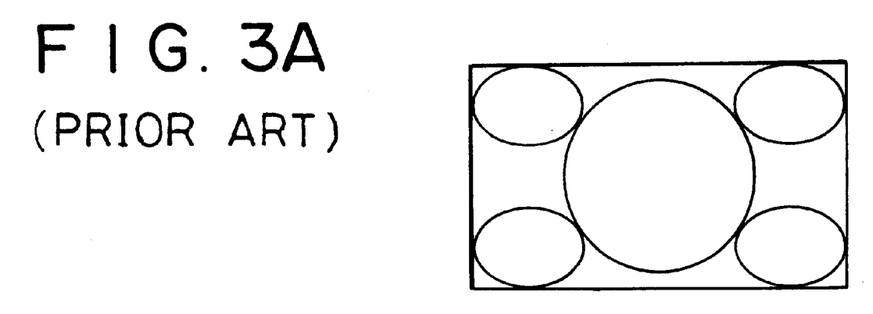
FIGS. 3A and 3B show another example in which the image shown in FIG. 5 is displayed by the conventional type display unit.
Figure 3B:
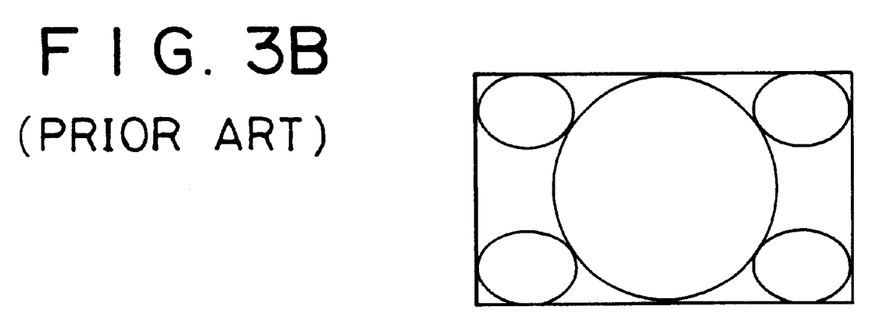

To solve the above problems, there is also a display unit provided with an image mode for displaying the whole image or almost all parts by distorting only a part of the image. FIGS. 3A and 3B show other examples in which the image shown in FIG. 1 is displayed on such a conventional type display unit. In such a conventional type display unit, an image is prevented from being distorted by approximating the roundness in the vicinity of the center in which the most important information on the screen is displayed to one and the image is gradually extended laterally as both ends approach. FIG. 3A shows a state in which the image is displayed as it is in the longitudinal direction on such a display unit. FIG. 3B shows a state in which the image is displayed with a scan rate in the longitudinal direction increased to prevent both ends from being extended laterally in such a display unit. In any case, the aspect ratio of the image is inaccurate in almost all parts of the screen.

As described above, in the conventional type display unit, to display an image without distortion, the image has to be displayed on the screen different in aspect ratio with the aspect ratio of the image kept and there is a problem that an important part of an image may be cut off or only a part of an effective screen is used. If an image is all displayed with it matched with a screen the aspect ratio in a part or the whole of an image has to be changed and there is a problem that the whole or a part of the image is distorted. As the size of an image and slight distortion on right and left sides also change if the linearity of a raster is changed as described above, there is a problem that readjustment of a raster is required.

SUMMARY OF THE INVENTION

The present invention is made to solve such problems and the object is to provide a display unit wherein the effective screen can be utilized up to the maximum without distorting a displayed image.

In the present invention, to solve the above problems, a display unit characterized in that signal processing means for generating a compressed video signal acquired by compressing the whole image information in a horizontal cycle of an input signal on time base, synchronizing signal generating means for generating a synchronizing signal for fixing phasic relationship with the above compressed video signal based upon a synchronizing signal separated from the input signal and display means for displaying the above compressed video signal together with the above synchronizing signal are provided to the display unit for displaying an input video signal is provided.

In the display unit composed as described above, the signal processing means compresses the whole image information in a horizontal cycle of an input video signal on a time basis and generates a new compressed video signal corresponding to a display and the synchronizing signal generating means generates a synchronizing signal corresponding to the new compressed video signal generated by the signal processing means based upon a synchronizing signal separated from the input signal. The display means controls scanning by an electron beam according to the new synchronizing signal generated by the synchronizing signal generating means and displays the generated new compressed video signal on the display.

DETAILED DESCRIPTION OF THE PREFERRED EMBODIMENTS

Referring to the drawings, an embodiment of the present invention will be described below.

Figure 4:
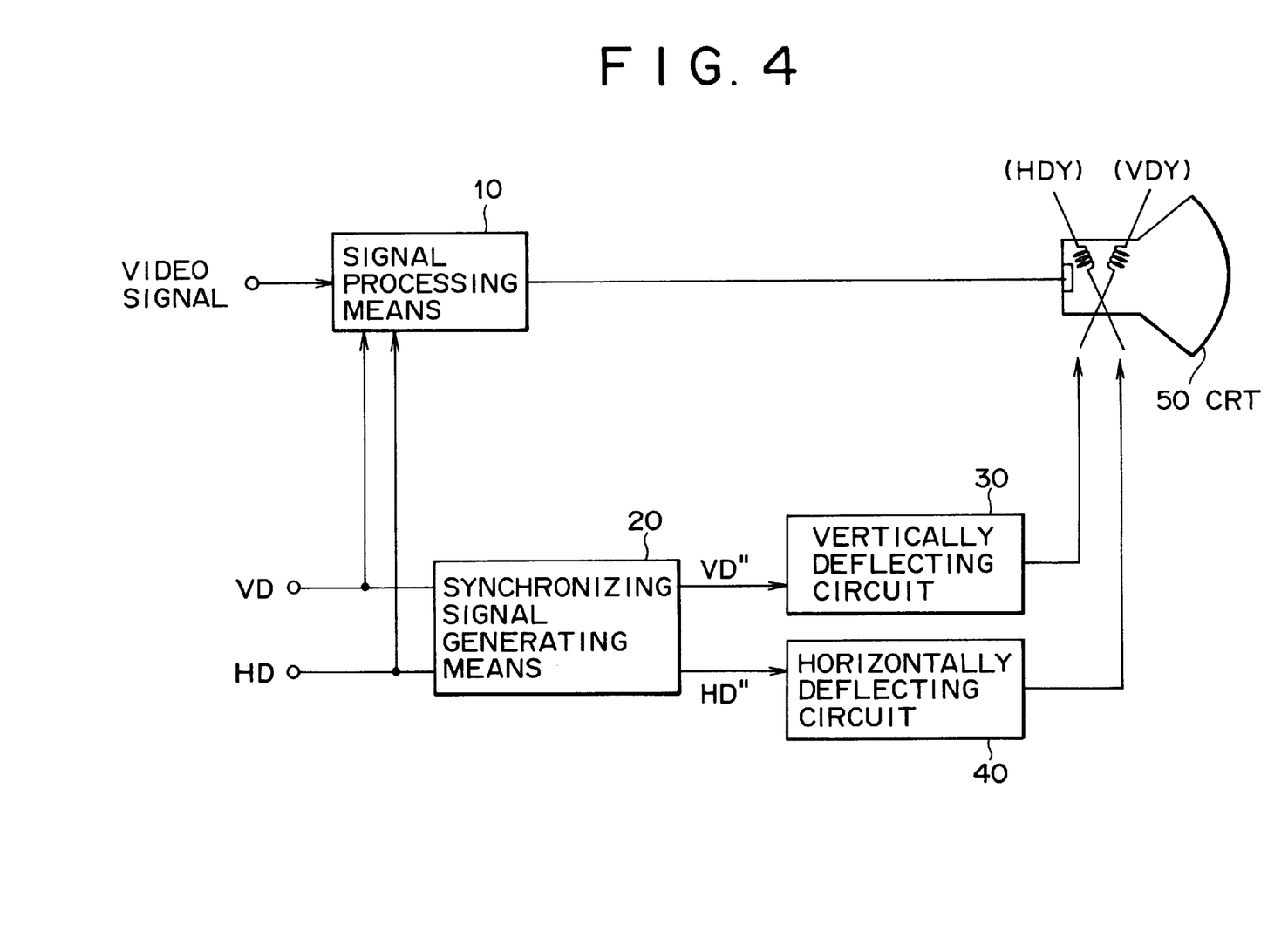
FIG. 4 is a block diagram showing a display unit equivalent to an embodiment of the present invention.

FIG. 4 is a block diagram showing a display unit equivalent to an embodiment of the present invention. The display unit according to the present invention is composed of signal processing means 10 for applying predetermined processing to an inputted video signal and outputting the signal, synchronizing signal generating means 20 for generating a new synchronizing signal based upon a horizontal synchronizing signal HD and a vertical synchronizing signal VD respectively separated from the video signal, a vertically deflecting circuit 30 for generating vertically deflecting current based upon a new vertical synchronizing signal VD" generated by the synchronizing signal generating means 20, a horizontally deflecting circuit 40 for generating horizontally deflecting current based upon a new horizontal synchronizing signal HD" and CRT 50 which is a display for displaying a video signal, that is, a display means. For example, a signal according to National Television System Committee (NTSC) fh of which is 15.734 kHz and fv of which is 60 kHz is input to the display unit. Where, fh means horizontal frequency, and fv means vertical frequency. To give a brief description below, only luminance and synchronizing signals of NTSC signals are examined.

The signal processing means 10 compresses the whole image information in horizontal cycle of an inputted video signal on time base and outputs the compressed video signal to the cathode of CRT 50. The synchronizing signal generating means 20 inputs a horizontal synchronizing signal HD and a vertical synchronizing signal VD respectively separated by not shown synchronizing separating circuit from the input video HD signal and generates a new horizontal synchronizing signal HD" and a new vertical synchronizing signal VD" based upon these HD and VD synchronizing signals. These new synchronizing signals HD" and VD" are generated so that there is provided a constant deflection phase relationship of the signals HD" and VD" with the video signals to be output by signal processing means 10. For example, new horizontally synchronizing signal HD" and vertically synchronizing signal VD" which delay the deflecting phase are generated so that an image based on a compressed video signal is displayed in a horizontal direction almost at the center of the display means. The new vertical synchronizing signal VD" is supplied to the vertically deflecting circuit 30 and vertically deflecting current based upon the new vertical synchronizing signal VD" is generated by the vertically deflecting circuit 30 and a vertically deflecting coil VDY. The new horizontal synchronizing signal HD" is supplied to the horizontally deflecting circuit 40 and horizontally deflecting current based upon the new horizontal synchronizing signal HD" is generated by the horizontally deflecting circuit 40 and a horizontally deflecting coil HDY. CRT 50 emits an electron beam based on video signals supplied to the cathode and displays an image on the screen.

The operation of the display unit composed as described above will be described below. An input signal is a signal according to NTSC for example and includes a video signal having the aspect ratio of 3:4, a horizontal synchronizing signal HD and a vertical synchronizing signal VD. The above video signal is supplied to the signal processing means 10 and also to the synchronizing signal separating circuit (not shown), and a horizontal synchronizing signal HD and a vertical synchronizing signal VD are extracted from the input video signal by a synchronization separating circuit not shown and are supplied to the synchronizing signal generating means 20. A new vertical synchronizing signal VD" generated by the synchronizing signal generating means 20 is supplied to the vertically deflecting circuit 30 and a new horizontal synchronizing signal HD" is supplied to the horizontally deflecting circuit 40. Vertically deflecting current based upon the supplied vertical synchronizing signal VD" is generated by the vertically deflecting circuit 30 and the vertically deflecting coil VDY. Also, horizontally deflecting current based upon the supplied horizontal synchronizing signal HD" is generated by the horizontally deflecting circuit 40 and the horizontally deflecting coil HDY. Scanning by an electron beam is controlled by a deflecting magnetic field generated by the vertically deflecting coil VDY and the horizontally deflecting coil HDY. CRT 50 emits an electron beam based on video signals supplied to the cathode and displays an image on the screen. In such a way, horizontal line scanning is executed by the horizontally deflecting circuit 40 and the horizontally deflecting coil HDY. Also, vertical field scanning is similarly executed by the vertically deflecting circuit 30 and the vertically deflecting coil VDY.

Figure 5:
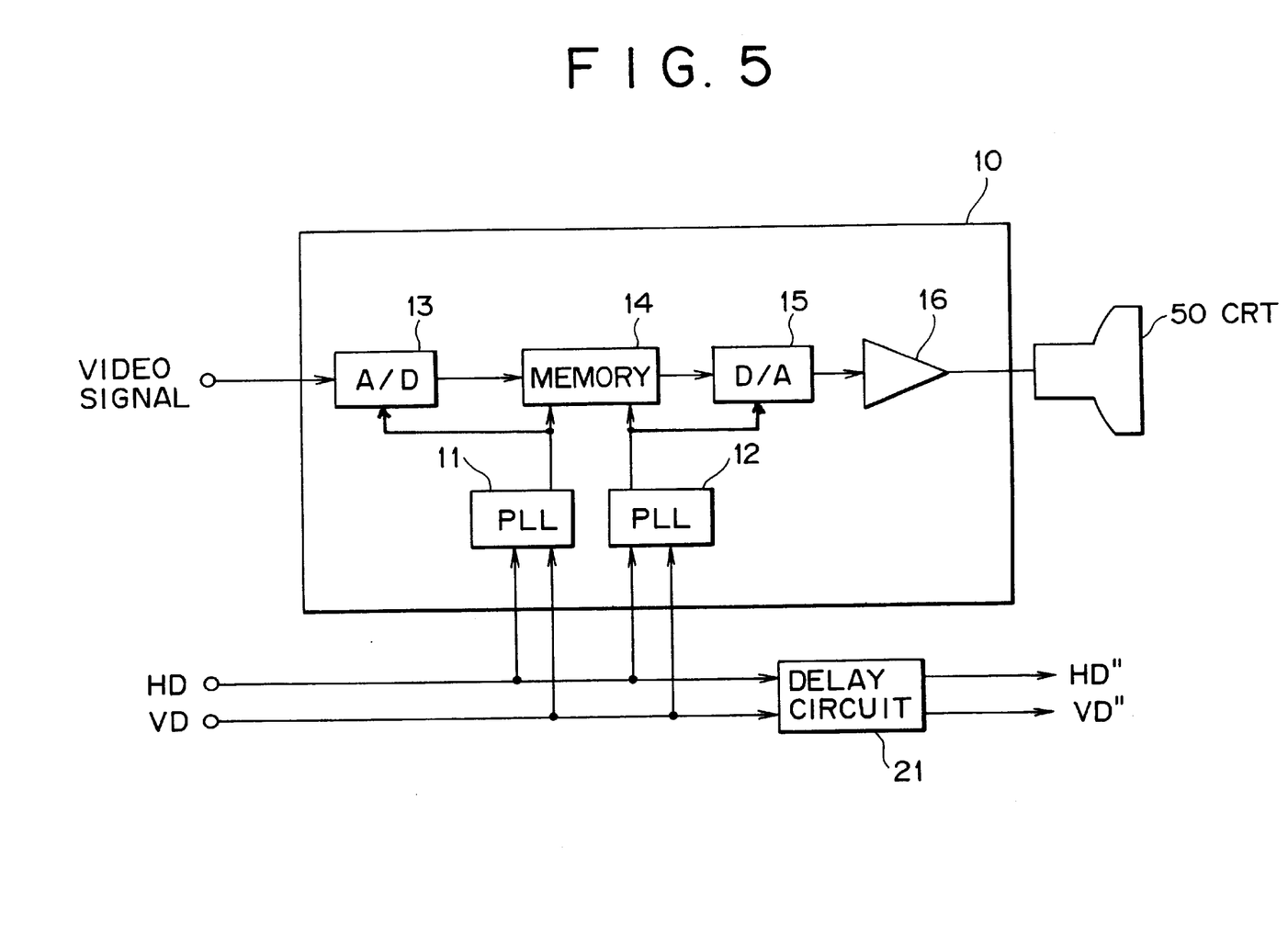
FIG. 5 are a block diagram showing signal processing means and synchronizing signal generating means of the display unit equivalent to an embodiment of the present invention.

Next, the signal processing means 10 and the synchronizing signal generating means 20 will be described in detail. FIG. 5 is a block diagram showing the signal processing means and the synchronizing signal generating means respectively of the display unit equivalent to an embodiment of the present invention.

The signal processing means 10 is provided with a first phase-locked loop (PLL) circuit 11 (hereinafter called PLL 11) which is clock signal generating means for inputting a horizontal synchronizing signal HD and a vertical synchronizing signal VD respectively separated from an NTSC signal and generating a first clock signal based upon these synchronizing signals and a second phase-locked loop (PLL) 12 (hereinafter called PLL 12) which is clock signal generating means for generating a second clock signal having a higher frequency than the first clock signal, and generates a basic clock signal for video signal processing. Further, the signal processing means 10 is provided with an analog-to-digital converting circuit 13 (hereinafter called an A/D converting circuit) for inputting a video signal and converting the input signal to a digital signal according to the first clock signal, a memory 14 which is recording means for recording a signal acquired by converting to a digital signal by the A/D converting circuit 13, a digital-to-analog converting circuit 15 (hereinafter called a D/A converting circuit) for reading a video signal recorded in the memory 14 according to the second clock signal and converting it to an analog signal and an amplifying circuit 16 for amplifying the analog signal. The synchronizing signal generating means 20 shown in FIG. 4 is corresponding to a delay circuit 21 shown in FIG. 5.

A horizontal synchronizing signal HD and a vertical synchronizing signal VD respectively separated from an inputted video signal are supplied to the first PLL 11. The first PLL 11 generates a first clock signal having a predetermined frequency used for writing to the memory 14 based upon the supplied synchronizing signals. The first clock signal has a frequency 858 to 910 times as many as a horizontal frequency fh synchronized with the horizontal synchronizing signal HD for example. The second PLL 12 generates a clock signal having a higher frequency than the clock signal generated by the first PLL 11. The second clock signal is used for reading from the memory 14. The A/D converting circuit 13 converts an input signal to a 8-bit digital signal for example according to the first clock signal generated by the first PLL 11. The memory 14 records a video signal converted to a digital signal. Video signals for two lines can be recorded in the memory 14. The video signal written to the memory 14 is read according to the second clock signal generated by the second PLL 12. The D/A converting circuit 15 converts the read digital signal to an analog signal and supplies it to the amplifying circuit 16. The amplifying circuit 16 amplifies the analog signal and supplies it to the cathode of CRT 50.

The delay circuit 21 inputs a horizontal synchronizing signal HD and a vertical synchronizing signal VD respectively separated from a video signal and generates a new horizontal synchronizing signal HD" and a new vertical synchronizing signal VD" respectively for fixing phasic relationship with the compressed video signal generated by the signal processing means 10. For example, a new horizontally synchronizing HD" and a new vertically synchronizing signal VD" which delay the deflecting phase are generated so that an image based on a compressed video signal is displayed in a horizontal direction almost at the center of the display means.

Figure 6A:
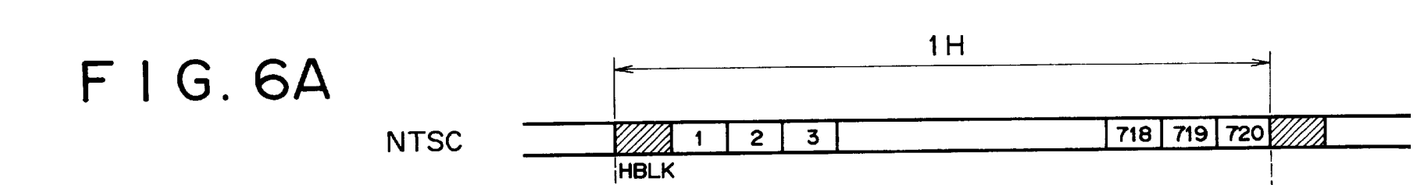
FIGS. 6A to 6C show a video signal input to the display unit equivalent to an embodiment of the present invention and a waveform of horizontally deflecting current corresponding to the video signal.
Figure 6B:
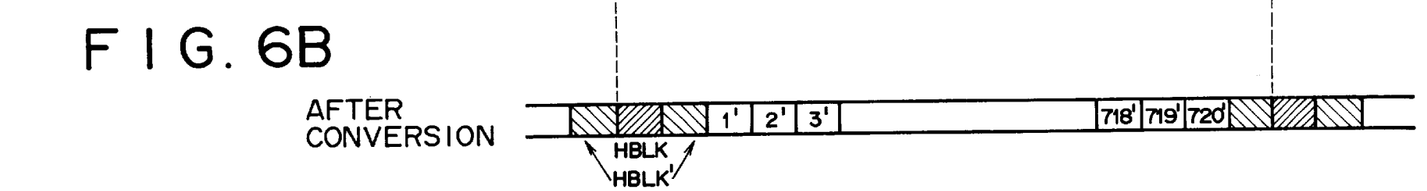
Figure 6C:
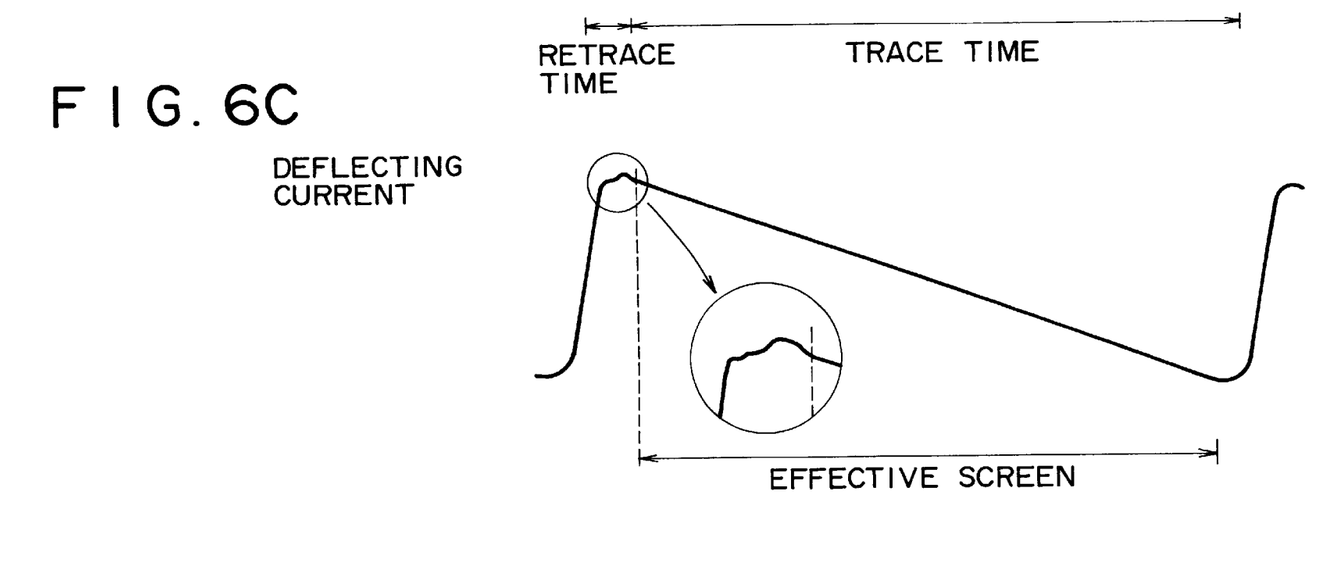

The operation of the signal processing means 10 and the synchronizing signal generating means 20 respectively composed as described above will be described below. First, horizontal line scanning for displaying a video signal converted as described above will be described. FIGS. 6A to 6C show a video signal of the display unit equivalent to an embodiment of the present invention and a waveform of horizontally deflecting current corresponding to the signal. FIG. 6A shows a video signal input in one horizontal cycle (1H). One horizontal cycle (1H) denotes a period from the start of a horizontal blanking interval HBLK to the start of the next horizontal blanking interval HBLK. A horizontal blanking signal at a pedestal level for example is supplied to the horizontal blanking interval HBLK. A picture signal in an effective image area is supplied next to the horizontal blanking interval HBLK. In this embodiment, the signals corresponding to 720-dot pixels are supplied and one horizontal cycle is completed.

The signal processing means 10 described above to which a video signal is input converts a video signal to a digital signal by the A/D converting circuit 13 according to a first clock signal generated by the first PLL 11 and records it in the memory 14. The video signal written to the memory 14 is read according to a second clock signal generated by the second PLL 12 and having a higher frequency than the first clock signal generated by the first PLL 11, is converted to an analog video signal by the D/A converting circuit 15, is amplified by the amplifying circuit 16 and is supplied to the cathode of CRT 50. As the signal processing means 10 uses the first clock signal generated by the first PLL 11 in writing to the memory 14 and uses the second clock signal generated by the second PLL 12 and having a higher frequency than the first clock signal generated by the first PLL 11 in reading from the memory 14 as described above, a video signal is compressed in a horizontal cycle on time base. FIG. 6B shows an output signal after conversion read from the memory 14. At this time, a pedestal level HBLK' is set so that it is read for fixed time before an effective video signal is read next to the horizontal blanking interval HBLK. The pedestal level HBLK' is also set so that it is read until the next horizontal blanking interval starts after an effective video signal is read. The frequencies of clock signals generated by the first PLL 11 and the second PLL 12 in this case are set according to the relationship between the frequency of the synchronizing signal for an original video signal and the frequency of the synchronizing signal for the video signal compressed in a time-axis direction for display on a screen.

A horizontal synchronizing signal HD" so as to fix the relationship between the phase of the video signal compressed in a time-axis direction and the horizontal deflection phase is generated by the delay circuit 21. In other words, for the purpose that an original video signal is subject to write and read processing for memory 14 in the signal processing means, since the phase of a video signal compressed in a time-axis direction which is to be output is delayed more than the phase of the synchronizing signal of an original video signal, the signal processing means 10 delays the synchronizing signal of the original signal specific time to compensate the difference between the phases and generates a new synchronizing signal. For example, new horizontally synchronizing HD" and vertically synchronizing signal VD" which delay the deflecting phase are generated so that an image based on a compressed video signal is displayed in a horizontal direction almost at the center of the display means. Line scanning with a correct phase is executed by the horizontally deflecting circuit and the horizontally deflecting coil according to the signal. FIG. 6C shows a waveform of deflecting current in a horizontal cycle. There, for convenience, the horizontal blanking interval HBLK and horizontal retrace time are equalized.

Video signals can be all displayed on an effective screen without distorting an image by compressing the video signals in a time-axis direction as described above. Further, as raster size in a horizontal direction is fixed, the adjustment of a part which fluctuates according to raster size such as the distortion of an image is not required.

Further, since the horizontally deflecting current flows with the amplitude corresponding to the horizontal-direction width of the effective screen whose aspect ratio is 9:16, and the place where the ringing (refer to the portion enclosed with a round frame shown in FIG. 6C) of the horizontally deflecting current occurs is outside the effective screen whose aspect ratio is 3:4, the image information of the original video signal having the aspect ratio of 3:4 is not cut off even if blanking is applied for the period when the ringing occurs. In other words, in the image display unit of the present invention, since the video signal having the aspect ratio of 3:4 is compressed in a time-axis direction as well as the horizontally deflecting current flows corresponding to the entire width of the screen whose aspect ratio is 9:16, the image need not be hidden by blanking and thus all of the effective video signals can be displayed.

Figure 7A:
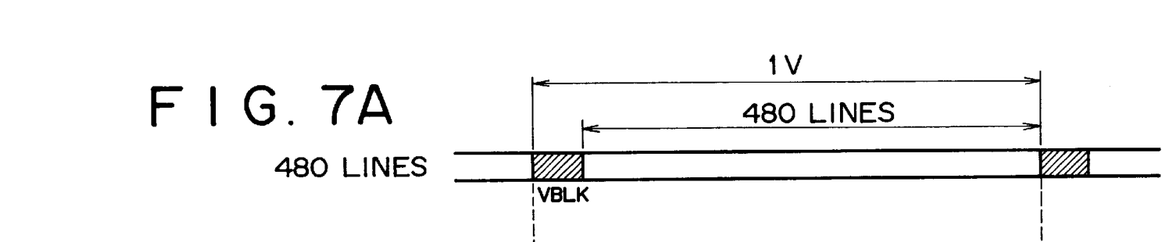
FIGS. 7A to 7D show a video signal input to the display unit equivalent to an embodiment of the present invention and a waveform of vertically deflecting current corresponding to the video signal.

Next, vertical field scanning to display a video signal converted as described above will be described. FIG. 7 shows a video signal and a waveform of vertically deflecting current corresponding to it in the display unit equivalent to an embodiment of the present invention. FIG. 7A schematically shows one vertical cycle (1V) of a video signal. One vertical cycle (1V) denotes a period from the start of a vertical blanking interval VBLK to the start of the next vertical blanking interval VBLK. Effective lines for 480 lines are allocated next to the vertical blanking interval VBLK. Vertical synchronizing signal VD" for fixing phasic relationship between the video signal and vertical deflection is generated by the delay circuit 21. Field scanning is executed by the vertically deflecting circuit 30 and the vertically deflecting coil VD according to the above vertical synchronizing signal VD". FIG. 7C shows a waveform of deflecting current in a vertical cycle. A broken line 31a denotes vertically deflecting current in case field scanning for 480 lines is executed. As described above, the image display unit of the present invention enables the displaying with a correct aspect ratio maintained because the image display unit requires no horizontal blanking. Therefore, compared with a general television set, the image display unit of the present invention can horizontally display more 10% images. FIG. 8 shows an example in which the image having the aspect ratio of 3:4 shown in FIG. 5 is displayed on CRT having the aspect ratio of 9:16 by the display unit equivalent to an embodiment of the present invention.

Figure 7B:
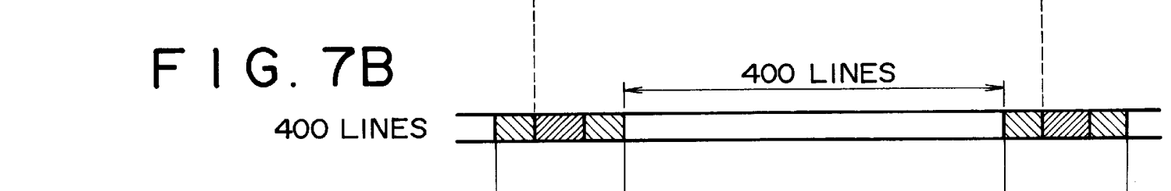
Figure 7C:
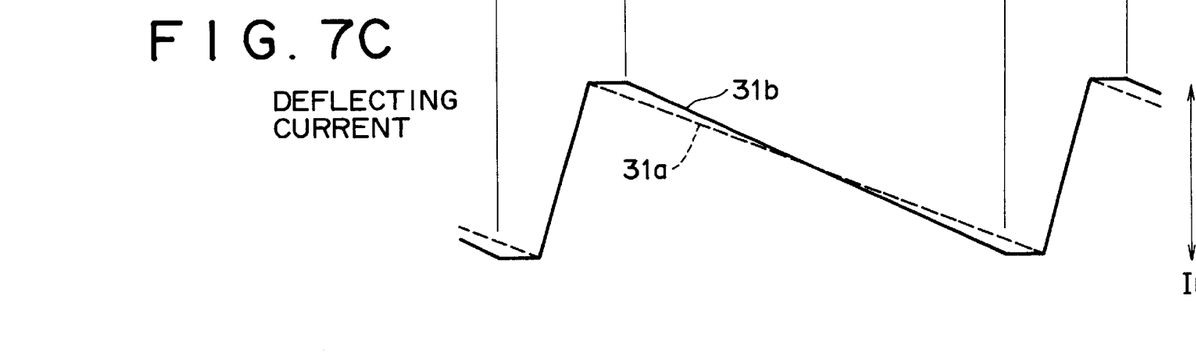
Figure 7D:
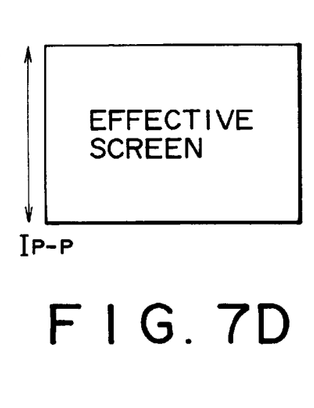
Figure 8:
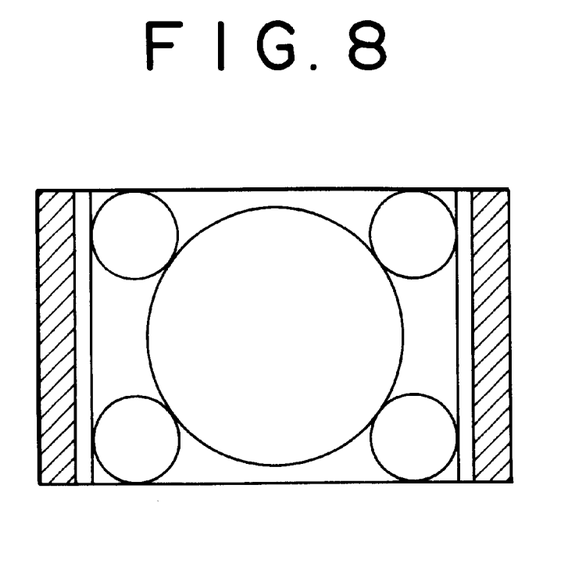
FIG. 8 shows an example in which the image shown in FIG. 1 is displayed by the display unit equivalent to an embodiment of the present invention.
Figure 9:
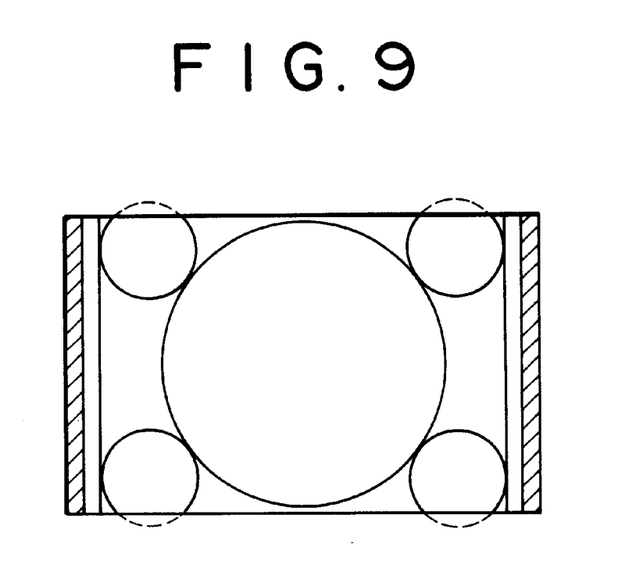
FIG. 9 shows another example in which the image shown in FIG. 1 is displayed by the display unit equivalent to an embodiment of the present invention.

FIGS. 7A to 7C will be described again. Further, an image can be also displayed at such size as important information of a video signal does not lack. For example, if 400 lines are displayed on the effective screen, images can be displayed on approximately 90% of the effective screen of CRT (see FIG. 7D) without being distorted. A solid line 31b shown in FIG. 7C denotes a waveform of vertically deflecting current at this time. That is, a peak-to-peak (P-P) value of deflecting current in a video interval to be displayed is fixed. FIG. 9 shows an example in which the image having the aspect ratio of 3:4 shown in FIG. 1 is displayed on only 400 lines of the effective screen of CRT having the aspect ratio of 9:16 by the display unit equivalent to an embodiment of the present invention. As described above, as the size of an image in the vertical direction can be changed depending upon the number of scanning lines, signal processing such as the interpolation of a line is not required.

In the above description, an input signal is a signal according to NTSC, however, the present invention is not limited to it and an input signal may also comply with another signal format. The aspect ratio of the display screen is 9:16, however, the present invention is not limited to this and the display unit may have an arbitrary aspect ratio.

The above processing functions can be realized by a computer. In that case, the processing contents of functions which the display unit should have are described in a program recorded on a computer readable record medium. The above processing is realized by a computer by running the program on the computer. For a computer readable record medium, there are a magnetic recording device, a semiconductor memory and others. In distribution on the market, such a program is stored on a portable record medium such as a compact disc read only memory (CD-ROM) and a floppy disk and distributed, is stored in the storage of a computer connected via a network and can be also transferred to another computer via the network. When such a program is run on a computer, it is stored in a hard disk and others in the computer, is loaded into a main memory and executed.

As described above, according to the present invention, the whole image information in a horizontal cycle of an input video signal is compressed on a time basis, a new video signal corresponding to a display is generated, a synchronizing signal corresponding to a new compressed video signal is generated based upon a synchronizing signal separated from the input signal and the new video signal is displayed on the display according to the synchronizing signal. Therefore, even if the aspect ratio of the video signal and the aspect ratio of the display are different, an image can be displayed without reducing the number of pixels in a horizontal direction. Also, at this time, the effective screen of the display can be utilized up to the maximum without distorting the displayed image.

What is claimed is:

1. An image display unit comprising:

display means having an effective screen of a first aspect ratio for displaying an image corresponding to an input video signal with a second aspect ratio smaller than said first aspect ratio by supplying said input video signal to said display means and controlling a deflection of said display means based on a video synchronizing signal separated from said input video signal;

signal processing means for generating a compressed video signal by compressing whole image information in a horizontal cycle of said input video signal on a time axis and for expanding a horizontal blanking interval so that said compressed video signal fits said horizontal cycle and said horizontal cycle is kept constant;

synchronizing signal generating means for generating a phase synchronizing signal for correcting a phase relationship between said compressed video signal and said video synchronizing signal separated from said input video signal; and deflecting means for deflecting an entire width of said display means based on said phase synchronizing signal independent of a difference in aspect ratio of said image of said input video signal.

2. The image display unit as claimed in claim 1, wherein said synchronizing signal generating means comprises:

a delaying means for delaying a deflection phase so that said image based on said compressed video signal is horizontally displayed near a center of said display means.

3. The image display unit as claimed in claim 1, wherein said signal processing means comprises:

first clock signal generating means for generating a first clock signal based on said video synchronizing signal separated from said input video signal;

an analog-to-digital converting circuit for converting said input video signal according to said first clock signal to a digital signal;

recording means for recording said digital signal;

second clock signal generating means for generating a second clock signal having a higher frequency than said first clock signal; and a digital-to-analog converting circuit for reading said digital signal recorded by said recording means according to said second clock signal and converting said digital signal to an analog signal.

4. The image display unit as claimed in claim 1, wherein said deflecting means performs field scanning so that lines at the top and bottom of effective lines for said inputted video signal are positioned outside said effective screen of said display means.

* * * * *